(12) United States Patent
Lin

(10) Patent No.: US 11,866,187 B1
(45) Date of Patent: Jan. 9, 2024

(54) ELECTRIC PROPULSION SYSTEM WITH POWER HARVESTING SYSTEM

(71) Applicant: BETA AIR, LLC, South Burlington, VT (US)

(72) Inventor: Chenjie Lin, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/966,694

(22) Filed: Oct. 14, 2022

(51) Int. Cl.
| | |
|---|---|
| *B64D 27/24* | (2006.01) |
| *H02K 11/04* | (2016.01) |
| *H02K 11/21* | (2016.01) |
| *H02K 11/35* | (2016.01) |
| *H02J 50/00* | (2016.01) |
| *B64D 45/00* | (2006.01) |
| *H02K 11/25* | (2016.01) |
| *B64C 29/00* | (2006.01) |

(52) U.S. Cl.
CPC ............ *B64D 27/24* (2013.01); *B64D 45/00* (2013.01); *H02J 50/001* (2020.01); *H02K 11/04* (2013.01); *H02K 11/21* (2016.01); *H02K 11/25* (2016.01); *H02K 11/35* (2016.01); *B64C 29/00* (2013.01)

(58) Field of Classification Search
CPC ....... B64D 27/24; B64D 45/00; H02J 50/001; H02K 11/04; H02K 11/21; H02K 11/25; H02K 11/35; B64C 29/00
USPC ........................................................ 310/68 D
See application file for complete search history.

(56) References Cited

U.S. PATENT DOCUMENTS

| | | | |
|---|---|---|---|
| 6,124,692 A * | 9/2000 | Canada ................. | H02K 11/20 318/490 |
| 8,968,138 B2 | 3/2015 | Kalmbach | |
| 10,461,596 B2 | 10/2019 | Dehez | |
| 11,563,348 B1 * | 1/2023 | Wiegman ............... | H02K 21/24 |
| 2010/0327766 A1 * | 12/2010 | Recker .................... | H02J 50/40 362/20 |
| 2011/0285256 A1 * | 11/2011 | Hyde ..................... | H02K 11/20 310/68 R |
| 2011/0285339 A1 * | 11/2011 | Hyde ....................... | H02K 9/24 318/473 |
| 2018/0026496 A1 * | 1/2018 | Zhi ........................ | H02K 11/35 310/68 B |
| 2019/0048988 A1 * | 2/2019 | Besser .................... | F16H 57/01 |
| 2019/0280550 A1 * | 9/2019 | Kay ........................ | H02K 15/04 |

(Continued)

FOREIGN PATENT DOCUMENTS

DE 102014213446 * 1/2016

*Primary Examiner* — Ahmed Elnakib
(74) *Attorney, Agent, or Firm* — Caldwell Intellectual Property Law

(57) ABSTRACT

An assembly of an electric propulsion system with power harvesting system and a method of manufacturing the electric propulsion system are disclosed. The electric propulsion system may include a propulsor configured to generate thrust. The electric propulsion system may include an electric motor configured to power the propulsor. The electric motor may include a stator configured to produce a magnetic field, wherein the stator may include a winding comprising an electrically conductive material. The electric motor may further include a rotor configured to be rotated by the magnetic field from the stator, wherein the rotor may include a coil attached to the rotor configured to induce an electric potential and an airgap between the stator and the coil.

20 Claims, 9 Drawing Sheets

(56) References Cited

U.S. PATENT DOCUMENTS

| | | |
|---|---|---|
| 2020/0385130 A1* | 12/2020 | Verna .................. H02K 5/1735 |
| 2022/0123635 A1 | 4/2022 | Popov |
| 2022/0224179 A1* | 7/2022 | Lin ..................... H02K 16/005 |
| 2022/0271625 A1* | 8/2022 | Kehr ....................... H02J 50/10 |
| 2022/0271627 A1* | 8/2022 | Kehr ................. H02K 11/0094 |

* cited by examiner

ELECTRIC PROPULSION SYSTEM WITH POWER HARVESTING SYSTEM

FIELD OF THE INVENTION

The present invention generally relates to the field of electric motors. In particular, the present invention is directed to an electric propulsion system with power harvesting system.

BACKGROUND

In electric multi-propulsion systems such as electric vertical take-off and landing (eVTOL) aircraft, efficiency of an electric propulsion system is crucial. Existing approaches to mitigating this issue are limited.

SUMMARY OF THE DISCLOSURE

In an aspect, the present disclosure is directed to an electric propulsion system with power harvesting system. The electric propulsion system may include a propulsor configured to generate thrust. The electric propulsion system may further include an electric motor configured to power the propulsor and including a stator configured to produce a magnetic field, wherein the stator may include a winding comprising an electrically conductive material, a rotor configured to be rotated by the magnetic field from the stator, wherein the rotor may include a coil attached to the rotor configured to induce an electric potential and an airgap between the stator and the coil.

In another aspect, the present disclosure is directed to a method of manufacturing an electric propulsion system with a power harvesting system, the electric propulsion system including containing a propulsor generating thrust and containing an electric motor powering the propulsor and including a stator producing a magnetic field, wherein the stator may include a winding including an electrically conductive material, a rotor being rotated by the magnetic field from the stator, wherein the rotor may include a coil attached to the rotor inducing an electric potential and an airgap between the stator and the coil.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
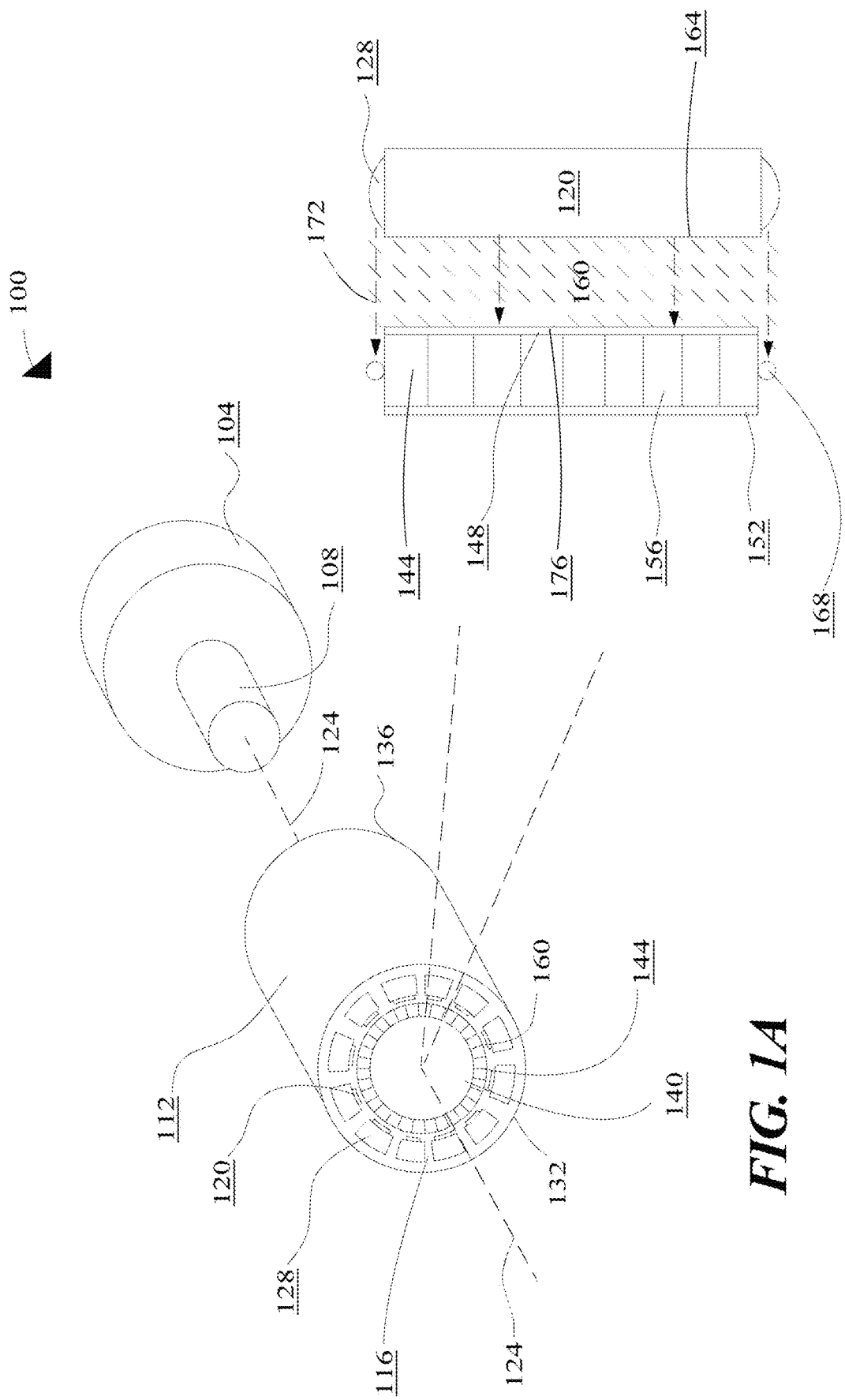
FIG. 1A is an exemplary illustration of an electric propulsion system.
FIG. 1B is an exemplary illustration of a cross-section of an electric motor.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for an electric propulsion system with power harvesting system. In an embodiment, the system may include a propulsor configured to generate thrust.

Aspects of the present disclosure can be used to contain an electric motor configured to power the propulsor. Aspects of the present disclosure can also be used to contain a stator producing a magnetic field, wherein the stator may include an electrically conductive material.

Aspects of the present disclosure allow for containing a rotor being rotated by the magnetic field from the stator wherein the rotor may include a coil attached to the rotor inducing an electric potential. The system may provide a wireless electrical connection between the coil and the stator through the airgap. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Embodiments of the system disclosed herein utilize integrated electric propulsion assemblies. Such assemblies may provide thrust in electric aircraft for situations such as takeoff, landing, hovering, or high-turbulence situations. The design of an integrated electric propulsion assembly offers benefits such as weight reduction. Additional benefits may include reduced drag from wind resistance, by avoiding a higher profile assembly, such as conventional assemblies mounting propulsors to motors by way of a collar or flange. Integrated electric propulsion assemblies may be enclosed in chambers in structural elements such as wings or outriggers of electric aircraft or other vehicles; in some embodiments, an integrated electric propulsion assembly may be used to reduce drag on the structural elements which reduces the demand on the energy source enabling longer flight times, especially in critical missions or in missions where the flight plans may be changed due to unforeseen environmental circumstances encountered during flight. In some embodiments, integrated electric propulsion assemblies may have elements which also function to cool internal components during flight. In another embodiment, an integrated electric propulsion assembly is integrated into one unit allowing for ease of installation, removal, maintenance or troubleshooting.

Referring now to FIG. 1A-B, an exemplary embodiment of an electric propulsion assembly 100 with a power harvesting system is illustrated. Assembly 100 may include propulsor 104, shaft 108, electric motor 112, stator 116, soft magnet 120, rotation axis 124, winding 128, first axial end 132, second axial end 136, rotor 140, permanent magnet array 144, insulating epoxy 148, retention sleeve 152, permanent magnet 156, airgap 160, inner surface 164, inductive coil 168, fringe flux 172, and outer surface 176. "Power harvesting," as used in this disclosure also known as energy harvesting, is a process by which energy is derived from external sources (e.g., solar power, thermal energy, wind energy, salinity gradients, and kinetic energy, also known as ambient energy), captured, and stored for an electric device, such as but not limited to a sensor, wireless device, lighting device, and the like. As a non-limiting example, a potential energy harvested by a coil inductor in an electric motor of an electric aircraft may provide DC power to a temperature sensor on the electric motor. An "electric propulsion," as used in this disclosure, is a class of propulsion which makes use of electrical power to accelerate a propellant by different possible electrical and/or magnetic means. "Propulsion," as used in this disclosure, is an action or a process of pushing or pulling to drive an object. An object, for example but not limited to, may be an airplane, a helicopter, a car, a truck, a bicycle, and the like. The electric propulsion system may consist of a source of mechanical power and a propulsor. A propulsor disclosed herein is described further in detail below. A source of mechanical power, as a non-limiting example, may be an engine, a motor, and the like. An engine is a machine designed to convert one or more forms of energy into mechanical energy. Energy source may include potential energy, heat energy, chemical energy, nuclear energy, and the like.

With continued reference to FIG. 1A-B, in some embodiments, electric propulsion assembly 100 may include propulsor 104. A "propulsor," as used herein, is a component or device used to propel an object by exerting force on a fluid medium, which may include a gaseous medium such as air or a liquid medium such as water. In an embodiment, propulsor 104 may be a vertical propulsor. A vertical propulsor is a propulsor that propels the aircraft in an upward direction; one of more vertical propulsors may be mounted on the front, on the wings, at the rear, and/or any suitable location. Alternatively or additionally, a vertical propulsor is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight. In another embodiment, propulsor 104 may be a forward propulsor. A forward propulsor is a propulsor that propels the aircraft in a forward direction. Forward in this context is not an indication of the propulsor position on the aircraft; one or more propulsors mounted on the front, on the wings, at the rear, etc. A forward propulsor as used in this disclosure is a propulsor positioned for propelling an aircraft in a "forward" direction; at least a forward propulsor may include one or more propulsors mounted on the front, on the wings, at the rear, or a combination of any such positions. A forward propulsor may propel an aircraft forward for fixed-wing and/or "airplane"-style flight, takeoff, and/or landing, and/or may propel the aircraft forward or backward on the ground.

With continued reference to FIG. 1A-B, in some embodiments, propulsor 104 may include a thrust element. A thrust element may include any device or component that converts the mechanical energy of a motor, for instance in the form of rotational motion of a shaft 108, into thrust in a fluid medium. The thrust element may include, without limitation, a device using moving or rotating foils, including without limitation, an airscrew or propeller, such as contra-rotating propellers, a moving or flapping wing, or the like. As another non-limiting example, the thrust element may include an eight-bladed pusher propeller, such as an eight-bladed propeller mounted behind the engine to ensure the drive shaft is in compression. Propulsor 104 be mechanically connected to electric motor 112. Electric motor 112 is disclosed further in detail below. Persons skilled in the art, upon reviewing the entirety of this disclosure, will be aware of various devices that may be used as at least a thrust element.

With continued reference to FIG. 1A-B, in some embodiments, assembly 100 may include electric motor 112. An "electric motor," as used in this disclosure, is an electrical machine that converts electrical energy into mechanical energy, for instance but not limited to, by causing shaft 108 to rotate. As a non-limiting example, an electric motor 112 of an electric airplane may convert electrical energy into mechanical energy to propel a propulsor to create a lift. Electric motor 112 may be driven by direct current (DC) electric power; for instance, electric motor 112 may include a brushed DC electric motor. A brushed DC electric motor, as used in this disclosure, is an internally commutated electric motor designed to be run from a direct current power source and utilizing an electric brush for contact. In some embodiments, electric motor 112 may be driven by electric power having varying or reversing voltage levels, such as alternating current (AC) power as produced by an alternating current generator and/or inverter, or otherwise varying power, such as produced by a switching power source. In some embodiments, electric motor 112 may include, without limitation, brushless DC electric motors, permanent magnet synchronous electric motors, switched reluctance motors, or induction motors. In addition to inverter and/or a switching power source, a circuit driving electric motor may include electronic speed controllers or other components for regulating motor speed, rotation direction, and/or dynamic braking.

With continued reference to FIG. 1A-B, in some embodiments, electric motor 112 may include stator 116. A "stator," as used in this disclosure, is a stationary part of a rotary system in an electric motor 112. In an embodiment, stator 116 may include an annular stator, wherein the stator is ring-shaped. In an embodiment, stator 116 may be incorporated into a DC motor where stator 116 is fixed and functions to supply the magnetic fields where a corresponding rotor rotates. A rotor herein is disclosed further in detail below. In an embodiment, stator 116 may be incorporated into an AC motor where stator 116 is fixed and functions to supply the magnetic fields by radio frequency electric currents through an electromagnet to a corresponding rotor rotates. A portion of stator 116 may be mechanically coupled to a portion of an electric aircraft, for instance and without limitation as described below with reference to FIG. 3. As used herein, a person of ordinary skill in the art would understand "mechanically coupled" to mean that at least a portion of a device, component, or circuit is connected to at least a portion of the electric aircraft via a mechanical coupling. Said mechanical coupling may include, as a non-limiting example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling may be used to join two pieces of rotating electric aircraft components.

With continued reference to FIG. 1A-B, in some embodiments, stator 116 may include soft magnet 120, wherein soft magnet 120 may be configured to hold winding 124. Winding 124 herein is disclosed further in detail below. Soft magnet 120 may have low coercivity, meaning that it can be easily magnetized and demagnetized. As a non-limited example, soft magnet 120 may be an annealed iron that can be magnetized but do not tend to stay magnetized. Soft magnet 120 may have high relative permeability, which is a measure of how readily the material responds to the applied magnetic field. In direct current (DC) applications, soft magnet 120 may be magnetized in order to perform an operation and then demagnetized at the conclusion of the operation. In alternating current (AC) applications, soft magnet 120 may be continuously cycled from being magnetized in one direction to the other, throughout the period of operation (e.g. a power supply transformer). In AC applications, how much energy is lost in the system as soft magnet 120 is cycled around its hysteresis loop may be considered. The energy loss may originate from hysteresis loss, wherein the hysteresis loss is related to the area contained within the hysteresis loop. Hysteresis losses may be reduced by the reduction of the intrinsic coercivity with a consequent reduction in the area contained within the hysteresis loop. The energy loss may originate from eddy current loss, wherein the eddy current loss is related to the generation of electric currents in the magnetic material and the associated resistive losses. The eddy current losses may be reduced by decreasing the electrical conductivity of the material and by laminating the material, which has an influence on overall conductivity and is important because of skin effects at higher frequency. The energy loss may originate from anomalous loss, wherein the anomalous loss is related to the movement of domain walls within the material. The anomalous losses my be reduced by having a completely homogeneous material, within which there may be no hindrance to the motion of domain walls.

With continued reference to FIG. 1, in some embodiments, stator 116 may include one or more soft magnet 120. In some embodiments, soft magnet 120 may be attached to an inner surface of stator 116, wherein the inner surface of stator 116 used herein may be a surface of stator 116 close to rotation axis 124. An "axis of rotation," as used in this disclosure, is a straight line through all fixed points of a rotating rigid body, such as but not limited to electric motor 112, around which all other points of the body move in circles. In some embodiments, soft magnet 120 may extend radially inward toward a rotation axis 124 but may not intersect with the rotation axis 124. Soft magnet 120 may be radially symmetrical about rotation axis 124, symmetrical about some other axis, or not symmetrical about any cross section. Soft magnet 120 may extend from first end 132 to second end 136 of stator 112. Soft magnet 120 may be a polygonal shape like a rectangle, square, circle, oval, T-shape, or substantially similar shape. Soft magnet 120 may, in some embodiments, be flanged. Soft magnet 120 may be insulated using an insulation material. As used in this disclosure, "insulating" is to separate the conducting bodies with nonconductors to prevent transfer of electricity, and/or heat, and/or sound. The insulation material may include, but is not limited to, fiberglass, mineral wool, cellulose, natural fibers, polystyrene, polyisocyanurate, polyurethane, perlite, cementitious foam, phenolic foam, insulation facings, and the like. In an embodiment, one or more fiberglass sheets may be applied to soft magnet 120.

With continued reference to FIG. 1A-B, in some embodiments, stator 116 may include winding 124. In some embodiments, winding 124 may be configured to provide a path for current to flow to create then a magnetic field to spin a rotor. In some embodiments, winding 124 may wound upon soft magnet 120. In an embodiment, winding 128 may include a first curve, wherein first curve is a first portion of winding 128 wound on a first surface of soft magnet 120. Winding 128 may wound upon soft magnet 120 in one or more layers. In another embodiment, winding 128 may include a second curve, wherein second curve is a second portion of winding 128 wound on a second surface of soft magnet 120. Winding 128 may wound upon soft magnet 120 in one or more layers. In some embodiments, winding 128 may include an electrically conductive material. The electrically conductive material may include a wire, filament, or other suitable material and configuration thereof to conduct electricity through it. The electrically conductive material may be soft, and/or bendable, and/or malleable, and/or the like. The electrically conductive material may include any material that is conductive to electrical current and may include, as a nonlimiting example, various metals such as copper, steel, or aluminum, carbon conducting materials, or any other suitable conductive material. In some embodiment, the electrically conductive material may include a multi-stranded conducting wire. A "multi-stranded conducting wire," is a bundle of a plurality of conducting wires. The multi-stranded conducting wire may be more flexible than solid wire of the same total cross-sectional area as the bundle. A "conducting wire," as used in this disclosure, is an electrically conductive wire that is capable of carrying electricity over a distance. Persons skilled in the art, upon reviewing the entirety of this disclosure, will be aware of various forms of electrically conductive material that may be used as windings on soft magnet consistent with the described methods and systems.

With continued reference to FIG. 1A-B, in some embodiments, the electrically conductive material wound upon soft magnet 120 may include Litz wires. Litz wires are a special type of multistrand wire or cable used in electronics to carry alternating current at radio frequencies. The Litz wire is designed to reduce the skin effect and proximity effect losses in conductors at frequencies up to about 1 Megahertz (MHz). The skin effect of electrical conductors is the tendency of an alternating current to become distributed within a conductor such that the current density is largest near the surface of the conductor and decreases exponentially with greater depths in the conductor. Therefore, the electric current flows mostly at the "skin" of the conductor, or more accurately, the portion of the wire or conductor at the greatest radial distance from the center line or centroid of the conductor. The skin depth, or area of conductor that electric current flows through depends on the frequency of the alternating current. Litz wire can be used to mitigate the skin effect by weaving insulated wires together in a carefully designed pattern such that the magnetic field acts equally on all the wires and causes to the total current to be distributed equally among the wires. The woven insulated wires do not suffer the same increase in alternating current resistance that a solid conductor of the same cross-sectional area would be due to the skin effect. The proximity effect in electrical conductors is the tendency of nearby conductors to distribute current in smaller regions within the present conductors. The crowding of conductors near each other increases the effective resistance due to the smaller area current can flow through in a conductor, and the effective resistance increases with frequency. Litz wires mitigates the loss due to proximity effect by distributing conductive paths in an arrangement that reduces effective electromagnetic fields.

With continued reference to FIG. 1A-B, in some embodiments, electric motor 112 may include rotor 140. A "rotor," as used herein, is a component of electric motor 112 that is configured to be rotated by a magnetic field generated from stator 116. In some embodiments, rotor 140 may include shaft 108. Shaft 108 may be disposed coaxially and coincidentally within stator 116. Shaft 108 may be rotatable relative to a stationary stator 116. Shaft 108 may be mechanically coupled to stator 116 within electric motor 112. Shaft 108 may be disposed opposing to inner cylindrical surface disposed on stator 116.

With continued reference to FIG. 1A-B, in an embodiment, shaft 108 may be mechanically coupled to propulsor 104. In another embodiment, rotor shaft 136 may be mechanically coupled to an impeller. An impeller, as disclosed herein, is used to increase or decrease the pressure and flow of a fluid, including at least air. An impeller may function to provide cooling to rotor 140 and/or electric motor 112. An impeller may include varying blade configurations, such as radial blades, non-radial blades, semi-circular blades and airfoil blades. An impeller may further include single and/or double-sided configurations. Additionally, or alternatively, in some embodiments, shaft 108 may be mechanically coupled to cooling vanes. Cooling vanes are used to lower the temperature of a high-velocity mechanical part, like rotor 140 in electrical motor 112. Cooling vanes may employ a plurality of physical principles to cool mechanical parts. Cooling vanes may draw cool air like a fan if mechanically coupled to rotor 140 at an angle sufficient to create a pressure differential in order to draw cool air from outside the motor housing into the relatively hot inner motor and cool internal mechanical parts by convection. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part.

With continued reference to FIG. 1A-B, in some embodiments, rotor 140 may include permanent magnet array 144. Permanent magnet array 144 may disposed radially about an axis of rotation of shaft 108 which is parallel and coincident with axis of rotation 124 of the stator 116. Permanent magnet array 144 includes a plurality of permanent magnets 156 disposed adjacent to each other. "Magnet array", as used in the entirety of this disclosure, is any combination of magnets, such that the magnets are adjacent in any orientation. Permanent magnet array 144 further includes an electrically insulating epoxy 148 that envelops at least a portion of the plurality of magnets. In an embodiment, electrically insulating epoxy 148 may include an epoxy resin mixed with a hardener. In an embodiment, electrically insulating epoxy may be applied through a vacuum fusion. In an embodiment, plurality of permanent magnets 156 may be placed into a half-rotor mold and electrically insulating epoxy may be inserted into the half-rotor mold through a vacuum pump. After heating and curing, mold may be opened to obtain a half of a rotor. The process may be repeated to obtain the other half of the rotor and then the two halves may be combined through the use of an epoxy adhesive. In some embodiments, electrically insulating epoxy may be applied through a "prepreg" technique, where the electrically insulating epoxy 148 may be applied while it is still in a semi-solid state to a prepreg mat, where the mat may be heated and placed on permanent magnet array 144. In an embodiment, permanent magnet array 144 may include retention sleeve 152 used to secure magnets in place during rotation or other motion present within the system. Retention sleeve 152 may be non-metallic like carbon fiber and epoxy, various plastics, rubbers, polymers, ceramics, or other composite materials. Retention sleeve 152 may be metallic material such as aluminum, steel, or titanium. The location of retention sleeve 152 in FIG. 1A-B is only for exemplary purposes. In an embodiment and without limitation, retention sleeve 152 may be configured to be coupled to electrically insulating epoxy 148 and/or any other component of the aircraft motor as described herein.

With continued reference to FIG. 1A-B, in some embodiments, permanent magnet array 144 may include a Halbach array. A Halbach array, as used in this disclosure, is a special arrangement of permanent magnets that augments the magnetic field on one side of the array while canceling the field to near zero on the other side of the array. For the purposes of this disclosure, a side of the array is defined as an area disposed relative to the array of magnets, for example, if the Halbach array is disposed radially on the cylindrical surface of the rotor shaft, one side may be captured with the Halbach array, and a second side may be the area outside of the Halbach array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable.

With continued reference to FIG. 1A-B, rotor 140 may include inductive coil 168 configured to induce an electric potential. A "coil," as used in this disclosure and also known as an electromagnetic coil, is an electrical conductor such as but not limited to a wire in a shape of a coil (i.e. spiral or helix). Electromagnetic coils are used in applications where electric currents interact with magnetic fields, in devices such as but not limited to electric motors, generators, inductors, electromagnets, transformers, and sensor coils. Either an electric current is passed through the wire of the coil to generate a magnetic field, or conversely, an external time-varying magnetic field through the interior of the coil generates an electromotive force (voltage) in the conductor. An "electric potential," disclosed herein, is defined as an amount of work energy needed to move a unit of electric charge from a reference point to a specific point in an electric field. As a non-limiting example, magnetic flux may get generated between stator 116 and rotor 140 when stator 116 generates magnetic field. In some embodiments, inductive coil 168 may include an air core coil. An "air core coil," as used in this disclosure, is an inductor without a magnetic core, but rather unsupported with only air inside of the coil. The air core coil may be used to reduce core losses (i.e. eddy current and stray losses.) The eddy current loss is related to the generation of electric currents in the magnetic material and the associated resistive losses. Eddy currents (also called Foucault's currents) are loops of electrical current induced within conductors by a changing magnetic field in the conductor according to Faraday's law of induction or by the relative motion of a conductor in a magnetic field. Eddy currents flow in closed loops within conductors, in planes perpendicular to the magnetic field. They can be induced within nearby stationary conductors by a time-varying magnetic field created by an AC electromagnet or transformer, for example, or by relative motion between a magnet and a nearby conductor. The magnitude of the current in a given loop is proportional to the strength of the magnetic field, the area of the loop, and the rate of change of flux, and inversely proportional to the resistivity of the material. The eddy current losses may be reduced by decreasing the electrical conductivity of the material and by laminating the material, which has an influence on overall conductivity and is important because of skin effects at higher frequency. The total losses due to eddy currents can be derived from the following formula:

$$P_e = k_e \cdot f^2 B_{max}^2 \tau^2 \cdot V,$$

wherein $P_e$ is power loss due to eddy current, $K_e$ is the eddy current constant, $B_{max}$ is the maximum flux density, f is the frequency of the induced voltage, $\tau$ is thickness of a material, and V is the volume of the material.

With continued reference to FIG. 1, in an embodiment, inductive coil 168 may be located on one end of rotor 140. As a non-limiting example, inductive coil 168 may be located at a first axial end 132 of rotor 140. In another non-limiting example, inductive coil 168 may be located at a second axial end 136 of rotor 140. In another embodiment, inductive coil 168 may be located at both first end 132 and second 136 of rotor 140. In some embodiments, inductive coil 168 may be located at close to the winding 128 of the stator 116. As a non-limiting example, an air core coil may be located at a first axial end 132 of rotor 140 close to winding 128 of the stator 116 at a first axial end 132.

With continued reference to FIG. 1A-B, in some embodiments, electric motor 112 may include airgap 160. "Airgap," as used in this disclosure, is a gap between two objects, such as but not limited to a gap between stator 116 and rotor 140. In an embodiment, airgap 160 may be disposed between inner surface 164 of stator 116 and outer surface 176 of rotor 140. In another embodiment, airgap 160 may be disposed between winding 128 and inductive coil 168. In some embodiments, airgap 160 may generate fringe flux 172. "Fringe flux," as used in this disclosure, is a phenomenon in which the magnetic flux flowing in a magnetic core spreads out (or fringes out) into the surrounding medium, for example but not limited to in the vicinity of air gap 160. A magnetic core is a piece of magnetic material with a high magnetic permeability used to confine and guide magnetic fields in electrical, electromechanical and magnetic devices such as electromagnets, transformers, electric motors, generators, inductors, magnetic recording heads, and magnetic assemblies. It is made of ferromagnetic metal such as iron, or ferrimagnetic compounds such as ferrites. The high permeability, relative to the surrounding air, causes the magnetic field lines to be concentrated in the core material. The magnetic field is often created by a current-carrying coil of wire around the core. The magnetic field is a vector field that describes the magnetic influence on moving electric charges, electric currents and magnetic materials. A moving charge in a magnetic field experiences a force perpendicular to its own velocity and to the magnetic field. As a non-limiting example, permanent magnet's 156 magnetic field may pull on ferromagnetic materials such as but not limited to iron. The magnetic flux through a surface ($\phi_B$) is the surface integral of the normal component of the magnetic field B over that surface. If the magnetic field is constant, the magnetic flux passing through a surface of vector area S is the following below:

$$\phi_B = B \cdot S = BS \cos \theta$$

where B is the magnitude of the magnetic field (the magnetic flux density) having the unit of Wb/m2 (tesla), S is the area of the surface, and $\theta$ is the angle between the magnetic field lines and the normal (perpendicular) to S.

With continued reference to FIG. 1A-B, in some embodiments, inductive coil 168 may be configured to convert fringe flux 172 generated through airgap 160 into an electric potential. "Electric potential," as used in this disclosure, is amount of work energy needed to move a unit of electric charge from a reference point to the specific point in an electric field. The electric potential may be calculated using the following below:

$$V = k \, q_1 \cdot q_2 / r^2,$$

where V is electric potential, k is Coulomb constant, $q_1$, $q_2$ are two charges, r is distance between charges. In an embodiment, inductive coil 168 may be configured to generate the potential when rotor 140 is rotating relative to stator 116. In another embodiment, inductive coil 168 may be configured to generate the potential when rotor 140 is static relative to stator 116.

With continued reference to FIG. 1A-B, electric motor 112 may include an electronic component. An "electronic component," as used in this disclosure, is a device that functionally rely on electric energy (i.e. AC or DC) to drive its parts. As a non-limiting example, the electrical device may include a sensor, a battery, a lighting, a wireless communication device, a transformer, and the like. The electronic component may be configured to receive a power generated by inductive coil 168. In an embodiment, the electronic component may be a temperature sensor. As a non-limiting example, the temperature sensor may detect a temperature of electric motor 112. A "temperature sensor," as used in this disclosure, is a device that detects heat and converts it into an electrical signal. As a non-limiting example, the temperature sensor may include thermocouples, thermistors, thermometers, passive infrared sensors, resistance temperature sensors (RTD's), semiconductor based integrated circuits (IC), a combination thereof or another undisclosed sensor type, alone or in combination.

"Temperature," as used in this disclosure, and as would be appreciated by someone of ordinary skill in the art, is a measure of the heat energy of a system. Temperature, as measured by any number or combinations of sensors, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection. A "sensor," as used in this disclosure, is a device that produces an output signal for the purpose of sensing a physical phenomenon.

With continued reference to FIG. 1A-B, in some embodiments, the electronic component may be a motion sensor configured to detect a motion of electric motor 112. "Motion," as used in this disclosure, and as would be appreciated by someone of ordinary skill in the art, is a measure of a move or a change in position. As a non-limiting example, the motion sensor may include which may include gyroscopes, accelerometers, inertial measurement unit (IMU), load cell, or the like. A gyroscope is a device used for measuring or maintaining orientation and angular velocity. An accelerometer is a device used for measuring acceleration. As a non-limiting example, the accelerometer in electric motor 112 may measure acceleration of rotor 140 rotating relative to stator 116. An inertial measurement unit is an electronic device that measures and reports a body's specific force, angular rate, and/or the orientation of the body, using a combination of accelerometers, gyroscopes, and/or magnetometers. A load cell converts a force such as but not limited to tension, compression, pressure, or torque into an electrical signal that can be measured and standardized.

With continued reference to FIG. 1A-B, in some embodiments, the electronic component may include a rotary encoder. A rotary encoder, also called a shaft encoder, is an electro-mechanical device that converts the angular position or motion of a shaft or axle to analog or digital output signals. There are two main types of rotary encoder: absolute and incremental. The output of an absolute encoder indicates the current shaft position, making it an angle transducer. The output of an incremental encoder provides information about the motion of the shaft, which typically is processed elsewhere into information such as position, speed and distance.

With continued reference to FIG. 1A-B, electric motor 112 may include an AC-to-DC converter. The AC-to-DC converter may include a step-down transformer. A step-down transformer, as used in this disclosure, is a device that transfers an alternating current from one circuit to one or more other circuits with a decrease of voltage. The step-down transformer may be configured to decrease a voltage level of an alternating current from inductive coil 168. As a non-limiting example, the step-down transformer may decrease 230 V current to 12 V current. The AC-to-DC converter may include a rectifier. A rectifier, as used in this disclosure, is an electrical device that converts alternating current which periodically reverses direction, to direct current, which flows in only one direction. The rectifier may be configured to convert an alternating current to direct current. As a non-limiting example, the rectifier may convert 12 voltage current to 12 voltage. In some embodiments, the rectifier may include a single-phase rectifier, a full-wave rectifier, three-phase rectifier, bridge rectifier, and the like. The bridge rectifier, as used in this disclosure, is a rectifier that includes four diodes in the process of converting alternating current to direct current.

With continued reference to FIG. 1A-B, in some embodiments, electric motor 112 may include an inverter. An "inverter," as used in this this disclosure, is a power electronic device or circuitry that changes direct current (DC) to alternating current (AC). An inverter (also called a power inverter) may be entirely electronic or may include at least a mechanism (such as a rotary apparatus) and electronic circuitry. In some embodiments, static inverters may not use moving parts in conversion process. Inverters may not produce any power itself; rather, inverters may convert power produced by a DC power source. Inverters may often be used in electrical power applications where high currents and voltages are present; circuits that perform a similar function, as inverters, for electronic signals, having relatively low currents and potentials, may be referred to as oscillators. In some cases, circuits that perform opposite function to an inverter, converting AC to DC, may be referred to as rectifiers. As used in this disclosure, "alternating current" is a flow of electric charge that periodically reverses direction. In some cases, an alternating current may continuously change magnitude overtime; this is in contrast to what may be called a pulsed direct current. Alternatively or additionally, in some cases an alternating current may not continuously vary with time, but instead exhibit a less smooth temporal form. For example, exemplary non-limiting AC waveforms may include a square wave, a triangular wave (i.e., sawtooth), a modifier sine wave, a pulsed sine wave, a pulse width modulated wave, and/or a sine wave. As a further non-limiting example, the inverter may include receiving a first input voltage and outputting a second voltage, wherein the second voltage is different from the first voltage. In some embodiments, an inverter may draw direct current from a power source. As used in this disclosure a "power source" is a source that that drives and/or controls any other flight component. For example, and without limitation power source may include an inverter that powers electric motor 112 that operates to move one or more lift propulsor components, to drive one or more blades, or the like thereof.

Figure 2:
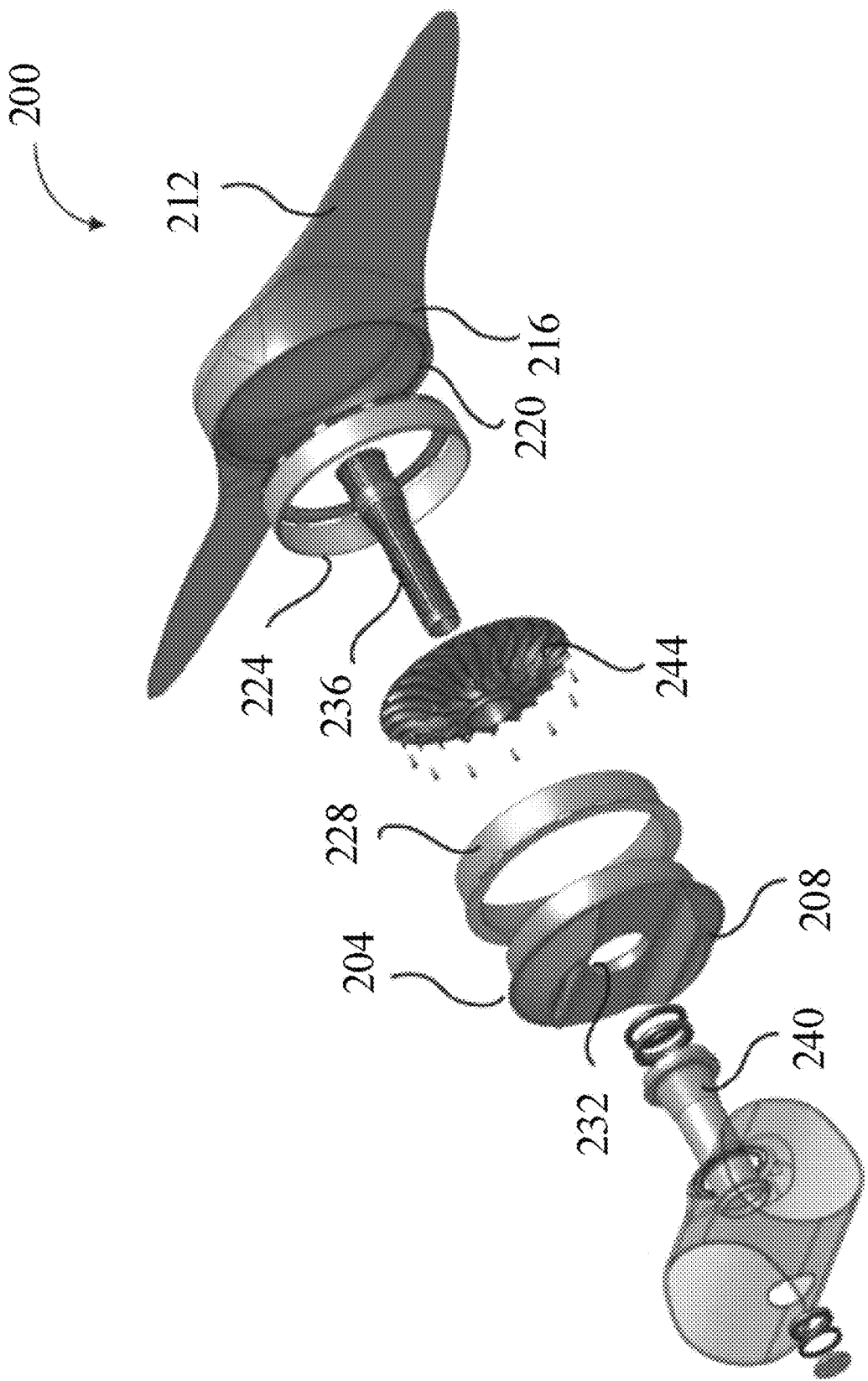
FIG. 2 is an exemplary embodiment of an integrated electrical propulsion system.

Referring now to FIG. 2, an embodiment of an integrated electric propulsion assembly 200 is illustrated. Integrated electric propulsion assembly 200 includes at least a stator 204. Stator 204 includes at least a first magnetic element 208. As used herein first magnetic element 208 is an element that generates a magnetic field. First magnetic element 208 may include one or more magnets which may be assembled in rows along a structural casing component. First magnetic element 208 may include one or more magnets having magnetic poles oriented in at least a first direction. One or more magnets may include at least a permanent magnet. Permanent magnets may be composed of, but not limited to, ceramic, alnico, samarium cobalt, neodymium iron boron materials, any rare earth magnets, and the like. One or more magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. Coil may be wound around a core, which may include without limitation an iron core or other magnetic material. Core may include a plurality of steel rings insulated from one another and then laminated together; the steel rings may include slots in which the conducting wire will wrap around to form a coil. At least a first magnetic element 208 may act to produce or generate a magnetic field to cause other magnetic elements to rotate, as described in further detail below. Stator 204 may include a frame to house components including at least a first magnetic element 208, as well as one or more other elements or components as described in further detail below. In an embodiment, magnetic field generated by at least a first magnetic element 208 may be a variable magnetic field; magnetic field may be varied by use of an inverter, a controller, or the like. In an embodiment, stator 204 may have an inner and outer cylindrical surface; a plurality of magnetic poles may extend outward from the outer cylindrical surface of the stator. In an embodiment, stator 204 is incorporated into a DC motor where stator 204 is fixed and functions to supply the magnetic fields where a corresponding rotor, as described in further detail below, rotates.

With continued reference to FIG. 2, integrated electric propulsion assembly 200 includes a propulsor 212 with an integrated rotor. Propulsor 212 may be any device or component that consumes electrical power on demand to propel an aircraft or other vehicle while on ground and/or in flight. Propulsor 212 may include one or more propulsive devices. At least a propulsor 212 includes a thrust element which may be integrated into the propulsor. At least a thrust element may include any device or component that converts the mechanical energy of a motor, for instance in the form of rotational motion of a shaft, into thrust in a fluid medium. At least a propulsive device may include, without limitation, a device using moving or rotating foils, including without limitation one or more rotors, an airscrew or propeller, a set of airscrews or propellers such as contra-rotating propellers, a moving or flapping wing, or the like. Propulsor 212 may include at least a blade. At least a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a propulsor 212. In an embodiment, when a propulsor twists and pulls air behind it, it will, at the same time, push the aircraft forward with an equal amount of force. The more air pulled behind the aircraft, the more the aircraft is pushed forward. At least a thrust element may include at least a helicopter rotor incorporated into propulsor 212. At least a helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. At least a helicopter rotor may include a plurality of blade or wing elements. Persons skilled in the art, upon reviewing the entirety of this disclosure, will be aware of various devices that may be used as at least a thrust element.

With continued reference to FIG. 2, propulsor 212 includes at least a hub 216 rotatably mounted to stator 204. Hub 216 is a structure which allows for the mechanically coupling of components of the integrated rotor assembly. In an embodiment, hub 216 is mechanically coupled with propellers or blades. Hub 216 may be cylindrical in shape to be able to be mechanically joined to other components of the rotor assembly; further examples for hub 216 and manners of attachment to and/or combination with other elements. Hub 216 may be constructed of any suitable material or combination of materials, including without limitation metal such as aluminum, titanium, steel, or the like, polymer materials or composites, fiberglass, carbon fiber, wood, or any other suitable material. Hub 216 may move in a rotational manner driven by interaction between stator and components in the rotor assembly.

With continued reference to FIG. 2, propulsor 212 includes at least a second magnetic element 220. At least a second magnetic element 220 generates a magnetic field designed to interact with first magnetic element 208. At least a second magnetic element 220 may be designed with a material such that the magnetic poles of at least a second magnetic element are oriented in an opposite direction from first magnetic element 208. In an embodiment, at least a second magnetic element 220 may be affixed to hub 216. At least a second magnetic element 220 may include any magnetic element suitable for use as at least a first magnetic element 208. For instance, and without limitation, at least a second magnetic element may include a permanent magnet and/or an electromagnet. At least a second magnetic element 220 may include magnetic poles oriented in a second direction which is opposite of at least a first magnetic element 208. In an embodiment, electric propulsion assembly 200 includes a motor assembly incorporating stator 204 with a first magnet element and at least a second magnetic element. First magnetic element 208 includes magnetic poles oriented in a first direction, at least a at least a second magnetic element includes a plurality of magnetic poles oriented in the opposite direction than the plurality of magnetic poles in the first magnetic element 208.

With continued reference to FIG. 2, at least second magnetic element 220 may include a plurality of magnets attached to or integrated in hub 216. In an embodiment, hub 216 may incorporate structural elements of the rotor assembly of the motor assembly; as a non-limiting example hub 216 may include a motor inner magnet carrier 224 and motor outer magnet carrier 228 incorporated into the hub 216 structure. Motor inner magnet carrier 224 and motor outer magnet carrier 228 may be cylindrical in shape. Motor inner magnet carrier 224 and motor out magnet carrier 216 may be any shape that would allow for a fit with the other components of the rotor assembly. Hub 216 may be short and wide in shape to reduce the profile height of the rotating assembly of electric propulsion assembly 200. Reducing the profile assembly height may have the advantage of reducing drag force on the external components. Hub 216 may also be cylindrical in shape so that fitment of the components in the rotor assembly are structurally rigid while leaving hub 216 free to rotate about stator. Motor outer magnet carrier 228 may have a slightly larger diameter than motor inner magnet carrier 224, or vice-versa. First magnetic element 208 may be a productive element, defined herein as an element that produces a varying magnetic field. Productive elements will produce magnetic field that will attract and other magnetic elements, including a receptive element. At least a second magnetic element may be a productive or receptive element. A receptive element will react due to the magnetic field of at least a first magnetic element 208. In an embodiment, at least a first magnetic element 208 produces a magnetic field which includes magnetic poles oriented in a first direction. At least a second magnetic element 220 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 216 and rotor assembly may both be cylindrical in shape where rotor may have a slightly smaller circumference than hub 216 to allow the joining of both structures. Coupling of hub 216 to stator 204 may be accomplished via a surface modification of either hub 216, stator 204 or both to form a locking mechanism. Coupling may be accomplished using additional nuts, bolts, and/or other fastening apparatuses. In an embodiment, an integrated rotor assembly as described above reduces profile drag in forward flight for an electric aircraft. Profile drag may be caused by a number of external forces that the aircraft is subjected to. By incorporating at least a propulsor 212 into hub 216, a profile of integrated electric propulsion assembly 200 may be reduced, resulting in a reduced profile drag, as noted above. In an embodiment, the rotor, which includes motor inner magnet carrier 224, motor outer magnet carrier 228, propulsor 212 is incorporated into hub 216 to become one integrated unit. In an embodiment, inner motor magnet carrier 212 rotates in response to a magnetic field. The rotation causes hub 216 to rotate. This unit can be inserted into integrated electric propulsion assembly 200 as one unit. This enables ease of installation, maintenance and removal.

With continued reference to FIG. 2, stator 204 may include a through-hole 232. Through-hole 232 may provide an opening for at least a component to be inserted through to aid in attaching propulsor with integrated rotor to stator. In an embodiment, through-hole 232 may have a round or cylindrical shape and be located at a rotational axis of stator 204. Hub 216 may be mounted to stator 204 by means of a shaft 236 rotatably inserted though through hole 232. Through-hole 232 may have a diameter that is slightly larger than a diameter of shaft 236 to allow shaft 236 to fit through through-hole 232 in order to connect stator 204 to hub 216. Shaft 236 may rotate in response to rotation of propulsor 212.

With continued reference to FIG. 2, integrated electric propulsion assembly 200 may include at least a bearing cartridge 240. Bearing cartridge 240 may include a bore. Shaft 236 may be inserted through the bore of bearing cartridge 240. Bearing cartridge 240 may be attached to a structural element of a vehicle. Bearing cartridge 240 functions to support the rotor and to transfer the loads from the motor. Loads may include, without limitation, weight, power, magnetic pull, pitch errors, out of balance situations, and the like. At least a bearing cartridge 240 may include a bore. At least a bearing cartridge 240 may include a smooth metal ball or roller that rolls against a smooth inner and outer metal surface. The rollers or balls take the load, allowing the device to spin. At least a bearing may include, without limitation, a ball bearing, a straight roller bearing, a tapered roller bearing or the like. At least a bearing cartridge 240 may be subject to at least a load which may include, without limitation, a radial or a thrust load. Depending on the location of bearing cartridge 240 in the assembly, it may see all of a radial or thrust load or a combination of both. In an embodiment, bearing cartridge 240 may join integrated electric propulsion assembly 200 to a structure feature. At least a bearing cartridge 240 may function to minimize the structural impact from the transfer of bearing loads during flight and/or to increase energy efficiency and power of propulsor. At least a bearing cartridge 240 may include a shaft and collar arrangement, wherein a shaft affixed into a collar assembly. At least a bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 240 may act to keep a propulsor 212 and components intact during flight by allowing integrated electric propulsion assembly 200 to rotate freely while resisting loads such as an axial force. In an embodiment, bearing cartridge 240 includes at least a roller bearing incorporated into the bore. At least a roller bearing is in contact with propulsor shaft 236. Stator 204 is mechanically coupled to inverter housing 240. Mechanically coupled may include a mechanical fastening, without limitation, such as nuts, bolts or other fastening device. Mechanically coupled may include welding or casting or the like. Inverter housing contains a bore which allows insertion by propulsor shaft 236 into bearing cartridge 240.

With continued reference to FIG. 2, electric propulsion assembly 200 may include a motor assembly incorporating a rotating assembly and a stationary assembly. Hub 216, motor inner magnet carrier 224 and propulsor shaft 236 may be incorporated into the rotor assembly of electric propulsion assembly 200 which make up rotating parts of electric motor, moving between the stator poles and transmitting the motor power. As one integrated part, the rotor assembly may be inserted and removed in one piece. Stator 204 may be incorporated into the stationary part of the motor assembly. Stator and rotor may combine to form an electric motor. In embodiment, an electric motor may, for instance, incorporate coils of wire which are driven by the magnetic force exerted by at least a first magnetic field on an electric current. The function of the motor may be to convert electrical energy into mechanical energy. In operation, a wire carrying current may create at least a first magnetic field with magnetic poles in a first orientation which interacts with at least a second magnetic field with magnetic poles oriented in the opposite direction of the first magnetic pole direction causing a force that may move a rotor in a direction. At least a first magnetic element 208 in electric propulsion assembly 200 may include an active magnet. At least a at least a second magnetic element may include a passive magnet, a magnet that reacts to a magnetic force generated by at least a first magnetic element 208. In an embodiment, at least a first magnet and at least a second magnet, positioned around the rotor assembly, may generate magnetic fields to affect the position of the rotor relative to the stator. A controller may have an ability to adjust electricity originating from a power supply and, thereby, the magnetic forces generated, to ensure stable rotation of the rotor, independent of the forces induced by the machinery process. Electric propulsion assembly 200 may include an impeller 244 coupled with the shaft 236. An impeller, as described herein, is a rotor used to increase or decrease the pressure and flow of a fluid and/or air. Impeller 244 may function to provide cooling to electric propulsion assembly 200. Impeller 244 may include varying blade configurations, such as radial blades, non-radial blades, semi-circular blades and airfoil blades. Impeller 214 may further include single and/or double-sided configurations. Impeller 214 is described in further detail below.

Figure 3:
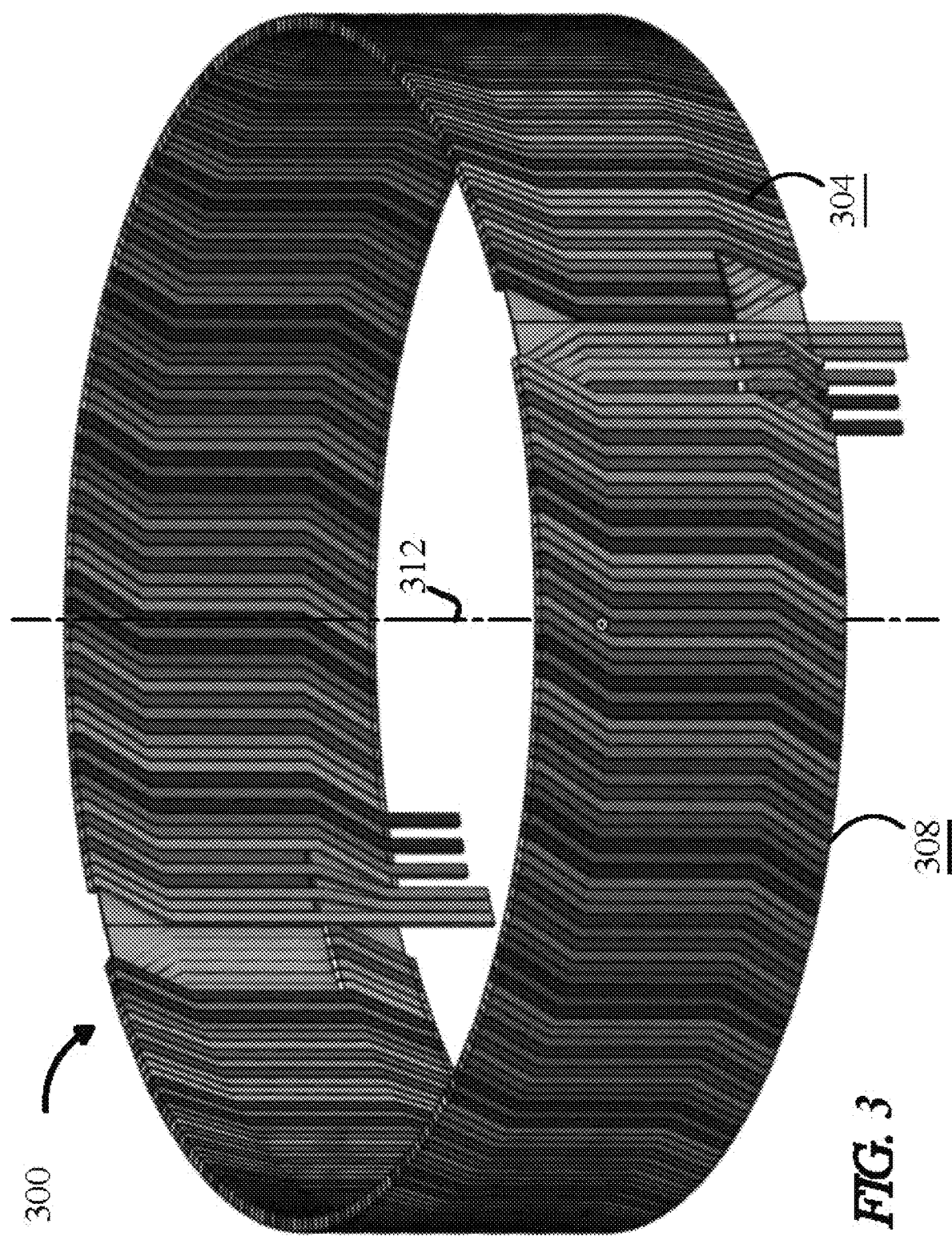
FIG. 3 is an exemplary embodiment of windings.

Referring now to FIG. 3, an embodiment of windings 300 is presented, which may be used in stator 116 is presented. Windings 300 may include axis of rotation 312. Axis of rotation 312 is the common center of the plurality of radially symmetric elements presented in the disclosure. For example, axis of rotation 312 is virtually equidistant to every point on inner cylindrical surface and virtually equidistant to every point on outer cylindrical surface. Axis of rotation 312 is coincident with the centerline hereinabove disclosed.

With continued reference to FIG. 3, windings 300 may include first winding 304 or second winding 308. With continued reference to FIGS. 3, winding 112, which include electrically conductive wires, may be wound upon the plurality of soft magnet 120 in a single layer. The winding 112 may be wound upon the plurality of soft magnet 120 in a double layer. For the purposes of this disclosure, layers refer to a winding of at least a segment of electrically conductive material laying on the surface of the plurality of soft magnet 120. A single layer lays directly on and around the plurality of soft magnet 120, while the second layer (i.e. the double layer configuration) would lay on the single layer below it. One of ordinary skill in the art would understand a single layer of wound electrically conductive wire may effectively transmit electrical energy through said winding and produce a magnetic field. In an illustrative embodiment, a double layered electrical wire winding may include a cross-sectional arrangement that a second layer may lay in the groove created by two adjacent windings in a first single layer below it relative to the plurality of soft magnet 120. In another illustrative embodiment, a double layer may be disposed on a segment in the layer directly below it relative the plurality of soft magnet 120.

Figure 4:
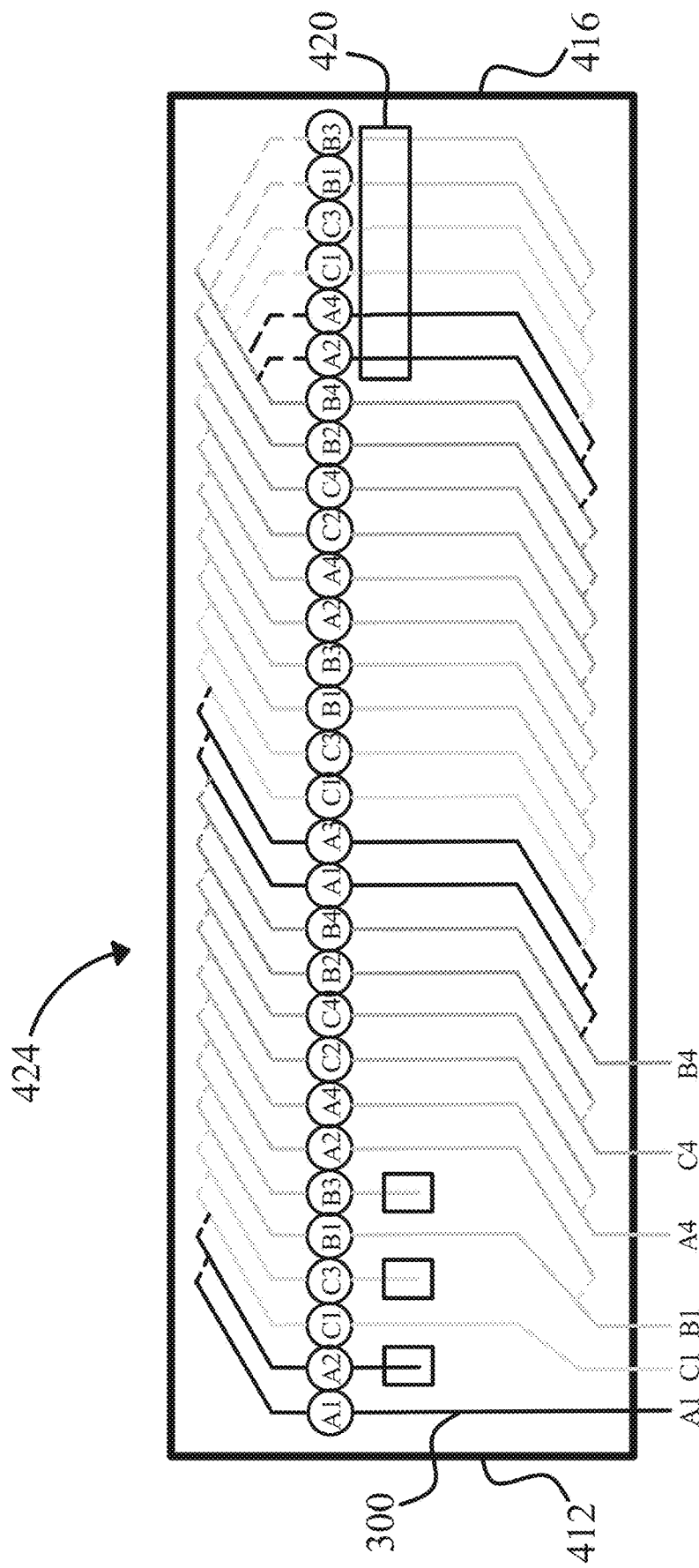
FIG. 4 is a schematic diagram of a portion of windings on a stator.

Referring now to FIG. 4, a schematic diagram illustrates a portion of windings 300 on a stator half; a portion of windings 300 may be suitable for use as first winding 304 and/or second winding 308. First winding 304 may include a first phase (initially denoted A1) that may traverse a first set of channels from first end 412, to second end 416, passing through mandrel through-hole 420 at second end 416 (with first phase now denoted as A2). A2 now traverses a second set of channels back to the first end 412. A first phase may additionally pass through second mandrel through-hole 420 at first end 412 (after which first phase is denoted as A3 in FIG. 4), and traverse a third set of channels to second end 416, and may pass through third mandrel through-hole 420 at second end 416 (now denoted as A4), and traverses a fourth set of channels back to first end 412. First winding 304 may include at least a second phase electrically isolated from the first phase; as illustrated without limitation in FIG. 4 there may be three total phases (A1-4, B1-4, and C1-4). Alternatively, or additionally, there may be more than three total phases of windings, or less than three phases. First winding 304 may be connected to at least a first inverter to provide current to the winding. In nonlimiting illustrative embodiments, each half of mandrel 424 may have 4 phases, corresponding to a total of 4 windings, and therefore there may be 4 inverters connected to 4 windings. A second winding may include a second phase that traverses a fifth set of channels from a fourth end to a fourth through-hole at the third end, and then traverses a sixth set of channels back to the fourth end, as described in first winding 304 in FIG. 3. A third winding may include a third phase that traverses a fifth through hole at a fourth end, and may traverse a seventh set of channels to a second end, and may pass through a sixth through-hole at a third end, and traverse an eighth set of channels back to a fourth end. A second winding may include at least a fourth phase electrically isolated from the first three phases. Alternatively, or additionally, there may be a single phase, or any number of electrically isolated phases for a winding, and there may be a single winding or any number of windings A second winding is connected to at least a second inverter, and in non-limiting illustrative embodiments, each winding may be connected to at least its own inverter. Exemplary embodiments of inverters to which windings may connect are illustrated below for exemplary purposes; there may be any number of inverters and corresponding windings, including without limitation six inverters and six corresponding windings. An inverter, for the purposes of this disclosure, is a power electronic device or circuitry that changes direct current (DC) to alternative current (AC). An inverter (also called a power inverter) can be entirely electronic or may be a combination of mechanical effects (such as a rotary apparatus) and electronic circuitry. Alternatively, static inverters do not use moving parts in the conversion process. Inverters do not produce any power itself, rather it converts power produced by a DC power source. Inverters are often used in electrical power applications where high currents and voltages are present; circuits that perform the same function for electronic signals, which usually have very low currents and voltages, are called oscillators. Circuits that perform the opposite function, converting AC to DC, are called rectifiers.

Figure 5A:
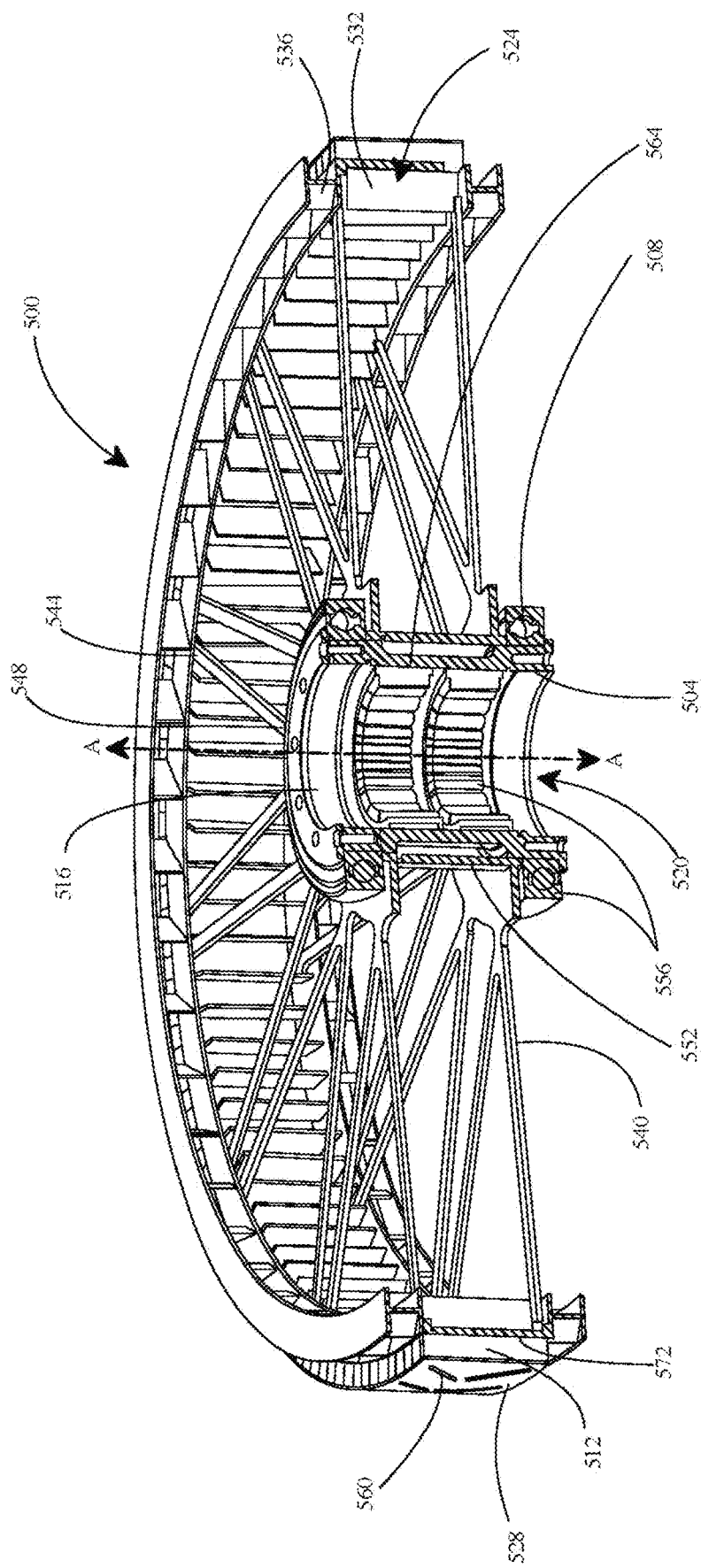
FIGS. 5A-B are cross-sectional views of an exemplary embodiment of a rotor of a motor of an electric aircraft.
Figure 5B:
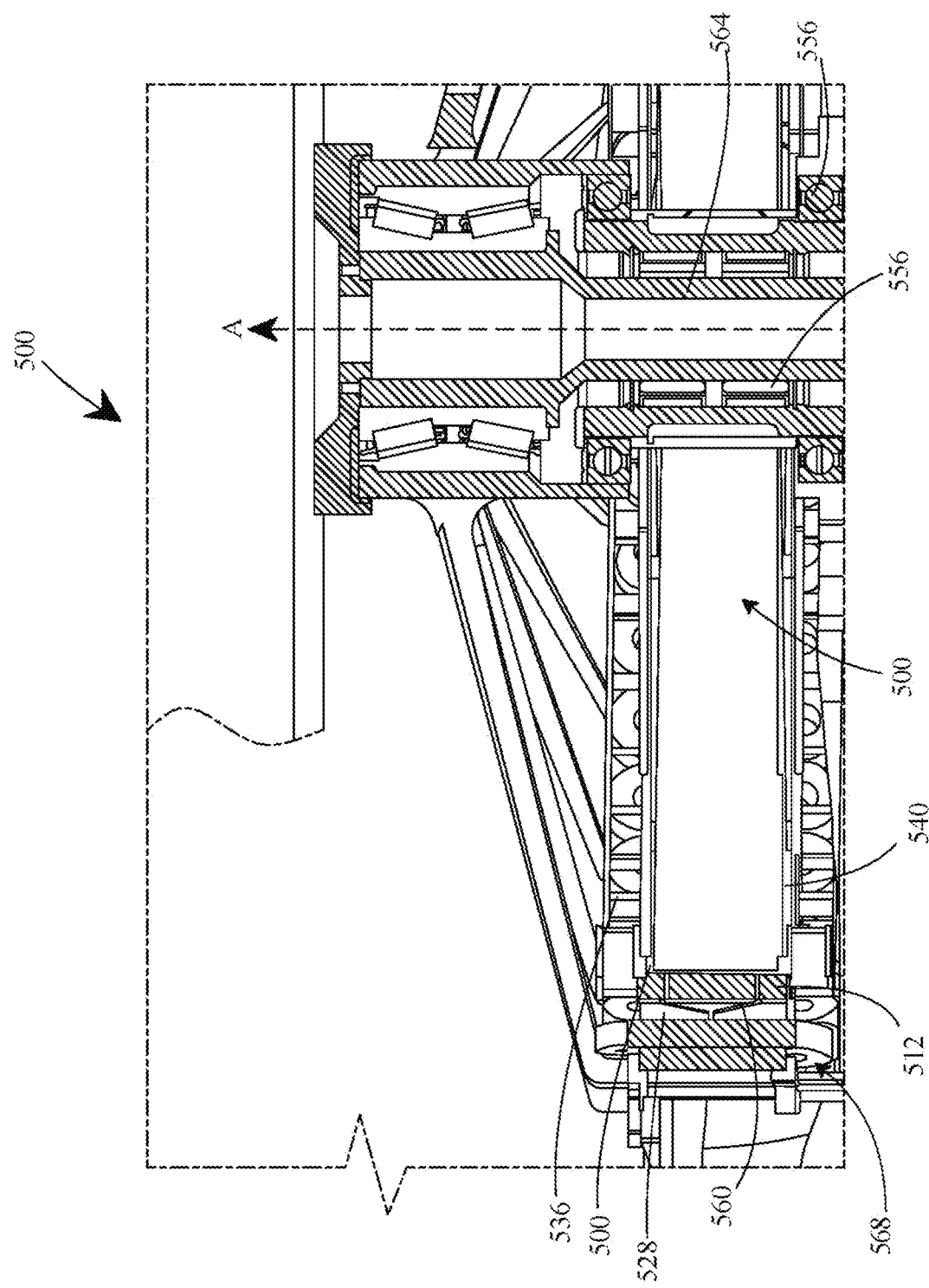

Referring now to FIGS. 5A and 5B, cross-sectional views of an exemplary embodiment of a rotor 500 of a motor of an electric aircraft are shown in accordance with one or more embodiments of the present disclosure. In one or more embodiments, rotor 500 includes a hub 508. Hub 508 may be a tubular structure. In one or more embodiments, inner surface 516 may define a lumen 520. Lumen 520 may be a longitudinal cavity that receives a roto shaft 564. Shaft 564 may be disposed within lumen 520 of hub 508 so that rotor 500 may rotate and simultaneously rotate shaft 564 which in turn rotates a propulsor. As used in this disclosure, a "lumen" is a central cavity, for example a tubular or cylindrical bore. Additional disclosure on a rotor may be found in U.S. application Ser. No. 17/704,798 titled "ROTOR FOR AN ELECTRIC AIRCRAFT MOTOR", which is incorporated in this disclosure in its entirety.

In one or more embodiments, hub 508 may comprise an inner hub 504 and an outer hub 552. In one or more embodiments, outer hub 552 may be attached to a proximal end 548 of spokes 540 of rotor 500, as discussed further below. In one or more embodiments, inner hub 504 may be secured to outer hub 552 using a locking mechanism. A locking mechanism may be configured to removably attach sprag 556 to hub 508. A locking mechanism may include a bolted joint, dowels, key, spline, and the like. In one or mor embodiments, the inner hub may include a sprag clutch 556, as discussed in more detail below.

In one or mor embodiments, rotor 500 includes a sprag 556. Sprag 556 may be disposed within inner hub 504. For example, and without limitation, sprag 556 may be attached to an inner surface 516 of inner hub 504. Sprag 556 may engage a rotor shaft (not shown) which allow for the rotational movement of rotor to be translated into a mechanical movement of, for example, a propulsor. Sprag 556 may include a sprag clutch. In one or more embodiments, sprag 556 may have a cage design, so that the sprags are less likely to lay down due to centrifugal force experienced when rotor is spinning. In one or more embodiments, sprag clutch 556 may include a maximum eccentricity of 90 microns.

With continued reference to FIGS. 5A and 5B, rotor 500 includes a hoop 524 concentrically positioned about hub 524. Hoop 524 may share a central axis A with hub 524. In one or more embodiments, hoop 524 includes magnets 512, which are position along an outer circumference of hoop 524 and attached to an outer surface of hoop 524. In one or more embodiments, a current may flow through a plurality of windings of a stator 568 that then results in the generation of electrically-induced magnetic fields that interact with magnets 512 to rotate rotor 500 about central axis A. During operation, rotor 500 may rotate axially about central axis A while stator remains still, thus, rotor 500 is rotatable relative to stator.

In one or more embodiments, magnets 512 of hoop 524 may be permanent magnets fixed to outer surface 572. Magnets 512 may be arranged concentrically to a central axis A of rotor 500. Thus, magnets 512 may be arranged in a ring along the outer circumference of hoop 524, which is defined by outer surface 572 of hoop 524. Magnets 512 may be arranged in a single ring or may be arranged in a plurality of rings along outer surface 572. Each magnet 512 may be positioned adjacent to another magnet 512 along convex outer surface so that stator 568 is continuously interacting with a magnet to produce a rotation of rotor 500. In one or more embodiments, hub and hoop may be made from various materials, such as, for example, steel.

In one or more embodiments, magnets 512 may include a magnet array. In non-limiting embodiments, a magnet array may include a Halbach array. A Halbach array is a special arrangement of permanent magnets that augments the magnetic field on one side of the array while canceling the field to near zero on the other side of the array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable.

In one or more embodiments, hoop 524 may include cooling features, such as, for example, an integrated radial fan 532 or an integrated axial fan 536. A radial fan may comprise cooling fins positioned on an upper surface of hoop 524 and provide cooling to a stator when rotor 500 is rotating about central axis A. An axial fan may include fins positioned along an inner surface of hoop 524 and provide cooling to motor. Radial and axial fans may be consistent with motor cooling fans provided in the disclosure U.S. application Ser. No. 17/563,498 titled "AN ELECTRIC AIRCRAFT LIFT MOTOR WITH AIR COOLING", which is incorporated in this disclosure in its entirety. In one or more embodiments, hoop 524 may include various types of materials, such as for example, titanium, steel, and the like. In one or more embodiments, hoop 524 may include a retention sleeve 528, which is configured to dissipate heat from rotor and/or motor. Retention sleeve 528 may be a strip and/or band of a solid material or an aggregation of individual materials that runs along an outer circumference of hoop 524. Retention sleeve 528 may be made from various materials, such as stainless steel, titanium, carbon, carbon-composite, and the like. Retention sleeve may provide stability for rotor 500 and prevent magnets 512 from lifting from outer surface 572 of hoop 524 by centrifugal forces. Retention sleeve 528 may include slits of various shapes and patterns to provide venting for temperature management purposes. For, example, slits 560 allow for air to pass through retention sleeve 528, allowing air to circulate through rotor 500 when rotor 500 is spinning about central axis A.

In one or more embodiments, rotor 500 includes a plurality of spokes 540, that radiate from hub 508 to connect hub 508 and hoop 524. Spokes 540 may extend radially outward from hub 508 to hoop 524. Spokes 540 may be positioned in various arrangement to provide structural support to rotor 500. In one or more embodiments, spokes 540 may be made from various materials, such as steel, titanium and the like. In some embodiments, hoop 524 and spokes 540 may be separate components that may be assembly together. In other embodiments, hoop 524 and spokes 540 may be a monolithic structure. For example, in some cases spokes may include a single element, such as without limitation a disc. Disc may be solid or may include holes. In one or more embodiments, a distal end 544 of each spoke may terminate at and/or be attached to hoop 524, and a proximal end of each spoke 540 may be attached to hub 508.

Figure 6:
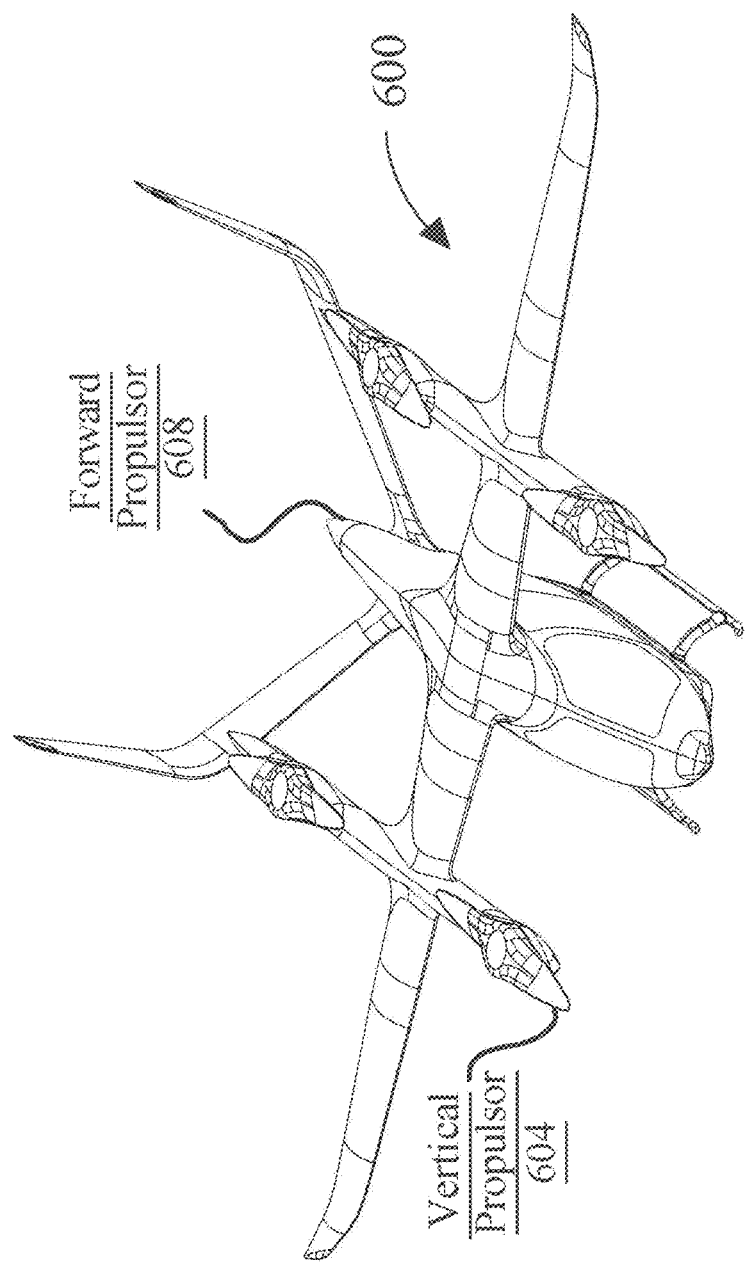
FIG. 6 is an exemplary embodiment of an electric aircraft.

Referring now to FIG. 6, an exemplary embodiment of an aircraft 600 is illustrated. Aircraft 600 may include an electrically powered aircraft (i.e., electric aircraft). In some embodiments, electrically powered aircraft may be an electric vertical takeoff and landing (eVTOL) aircraft. In some embodiments, aircraft 600 may include a fuselage 604. Fuselage 604 may comprise structural elements that physically support the shape and structure of an aircraft. Structural elements may take a plurality of forms, alone or in combination with other types. Structural elements may vary depending on the construction type of aircraft and specifically, the fuselage. Fuselage 604 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 6, aircraft 600 may include a plurality of actuators 608. Actuator 608 may include any motor and/or propulsor described in this disclosure. In an embodiment, actuator 608 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 6, a plurality of actuators 608 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 608 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 608 may include a rudder, which may include, without limitation, a segmented rudder that produces a torque about a vertical axis. Additionally or alternatively, plurality of actuators 608 may include other flight control surfaces such as propulsors, rotating flight controls, or any other structural features which can adjust movement of aircraft 600. Plurality of actuators 608 may include one or more rotors, turbines, ducted fans, paddle wheels, and/or other components configured to propel a vehicle through a fluid medium including, but not limited to air.

Still referring to FIG. 6, plurality of actuators 608 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

Still referring to FIG. 6, in another embodiment, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 6, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 6, plurality of actuators 608 may include power sources, control links to one or more elements, fuses, and/or mechanical couplings used to drive and/or control any other flight component. Plurality of actuators 608 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 6, plurality of actuators 608 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

Still referring to FIG. 6, in another embodiment, an energy source may be used to provide a steady supply of electrical power to a load over a flight by an electric aircraft 600. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 6, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 6, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 6, another exemplary actuator may include landing gear. Landing gear may be used for take-off and/or landing/Landing gear may be used to contact ground while aircraft 600 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 6, aircraft 600 may include a pilot control 612, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 608. For example and without limitation, collective control may alter and/or adjust the pitch angle of all of the main rotor blades collectively. For example, and without limitation pilot control 612 may include a yoke control. As used in this disclosure a "yoke control" is a mechanical control of an aircraft to control the pitch and/or roll. For example and without limitation, yoke control may alter and/or adjust the roll angle of aircraft 600 as a function of controlling and/or maneuvering ailerons. In an embodiment, pilot control 612 may include one or more foot-brakes, control sticks, pedals, throttle levels, and the like thereof. In another embodiment, and without limitation, pilot control 612 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 600 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 600 upwards. Principal axis may include a roll axis. As used in this disclosure a "roll axis" is an axis that is directed longitudinally towards the nose of the aircraft, parallel to the fuselage.

For example, and without limitation, a positive rolling motion may include lifting the left and lowering the right wing concurrently.

Still referring to FIG. 6, pilot control 612 may be configured to modify a variable pitch angle. For example, and without limitation, pilot control 612 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 612 may modify the variable pitch angle from a first angle of 2.71° to a second angle of 3.52°. Additionally or alternatively, pilot control 612 may be configured to translate a pilot desired torque for flight component 608. For example, and without limitation, pilot control 612 may translate that a pilot's desired torque for a propeller be 160 lb. ft. of torque. As a further non-limiting example, pilot control 612 may introduce a pilot's desired torque for a propulsor to be 290 lb. ft. of torque. Additional disclosure related to pilot control 612 may be found in U.S. patent application Ser. Nos. 17/001,545 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 6, aircraft 600 may include a loading system. A loading system may include a system configured to load an aircraft of either cargo or personnel. For instance, some exemplary loading systems may include a swing nose, which is configured to swing the nose of aircraft 600 of the way thereby allowing direct access to a cargo bay located behind the nose. A notable exemplary swing nose aircraft is Boeing 747. Additional disclosure related to loading systems can be found in U.S. patent application Ser. No. 17/107,594 entitled "SYSTEM AND METHOD FOR LOADING AND SECURING PAYLOAD IN AN AIRCRAFT" by R. Griffin et al., entirety of which in incorporated herein by reference.

Still referring to FIG. 6, aircraft 600 may include a sensor 616. Sensor 616 may include any sensor or noise monitoring circuit described in this disclosure. 616 may be configured to sense a characteristic of pilot control 612. Sensor may be a device, module, and/or subsystem, utilizing any hardware, software, and/or any combination thereof to sense a characteristic and/or changes thereof, in an instant environment, for instance without limitation a pilot control 612, which the sensor is proximal to or otherwise in a sensed communication with, and transmit information associated with the characteristic, for instance without limitation digitized data. Sensor 616 may be mechanically and/or communicatively coupled to aircraft 600, including, for instance, to at least a pilot control 612. Sensor 616 may be configured to sense a characteristic associated with at least a pilot control 612. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 616 may include at least a geospatial sensor. Sensor 616 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 600 for both critical and non-critical functions. Sensor may be incorporated into vehicle or aircraft or be remote.

Still referring to FIG. 6, in some embodiments, sensor 616 may be configured to sense a characteristic associated with any pilot control described in this disclosure. Non-limiting examples of a sensor 616 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 616 may sense a characteristic as an analog measurement, for instance, yielding a continuously variable electrical potential indicative of the sensed characteristic. In these cases, sensor 616 may additionally comprise an analog to digital converter (ADC) as well as any additionally circuitry, such as without limitation a Whetstone bridge, an amplifier, a filter, and the like. For instance, in some cases, sensor 616 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 600, for instance without limitation a computing system, a pilot display, and a memory component. Alternatively or additionally, sensor 616 may sense a characteristic of a pilot control 612 digitally. For instance in some embodiments, sensor 616 may sense a characteristic through a digital means or digitize a sensed signal natively. In some cases, for example, sensor 616 may include a rotational encoder and be configured to sense a rotational position of a pilot control; in this case, the rotational encoder digitally may sense rotational "clicks" by any known method, such as without limitation magnetically, optically, and the like.

Still referring to FIG. 6, electric aircraft 600 may include at least a motor 624, which may be mounted on a structural feature of the aircraft. Design of motor 624 may enable it to be installed external to structural member (such as a boom, nacelle, or fuselage) for easy maintenance access and to minimize accessibility requirements for the structure.; this may improve structural efficiency by requiring fewer large holes in the mounting area. In some embodiments, motor 624 may include two main holes in top and bottom of mounting area to access bearing cartridge. Further, a structural feature may include a component of electric aircraft 600. For example, and without limitation structural feature may be any portion of a vehicle incorporating motor 624, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 608. Persons skilled in the art, upon reviewing the entirety of this disclosure, will be aware of various materials, combinations of materials, and/or constructions techniques.

Still referring to FIG. 6, a number of aerodynamic forces may act upon the electric aircraft 600 during flight. Forces acting on electric aircraft 600 during flight may include, without limitation, thrust, the forward force produced by the rotating element of the electric aircraft 600 and acts parallel to the longitudinal axis. Another force acting upon electric aircraft 600 may be, without limitation, drag, which may be defined as a rearward retarding force which is caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor 608 of the electric aircraft. Lift generated by the airfoil may depend on speed of airflow, density of air, total area of an airfoil and/or segment thereof, and/or an angle of attack between air and the airfoil. For example, and without limitation, electric aircraft 600 are designed to be as lightweight as possible. Reducing the weight of the aircraft and designing to reduce the number of components is essential to optimize the weight. To save energy, it may be useful to reduce weight of components of electric aircraft 600, including without limitation propulsors and/or propulsion assemblies. In an embodiment, motor 624 may eliminate need for many external structural features that otherwise might be needed to join one component to another component. Motor 624 may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

Figure 7:
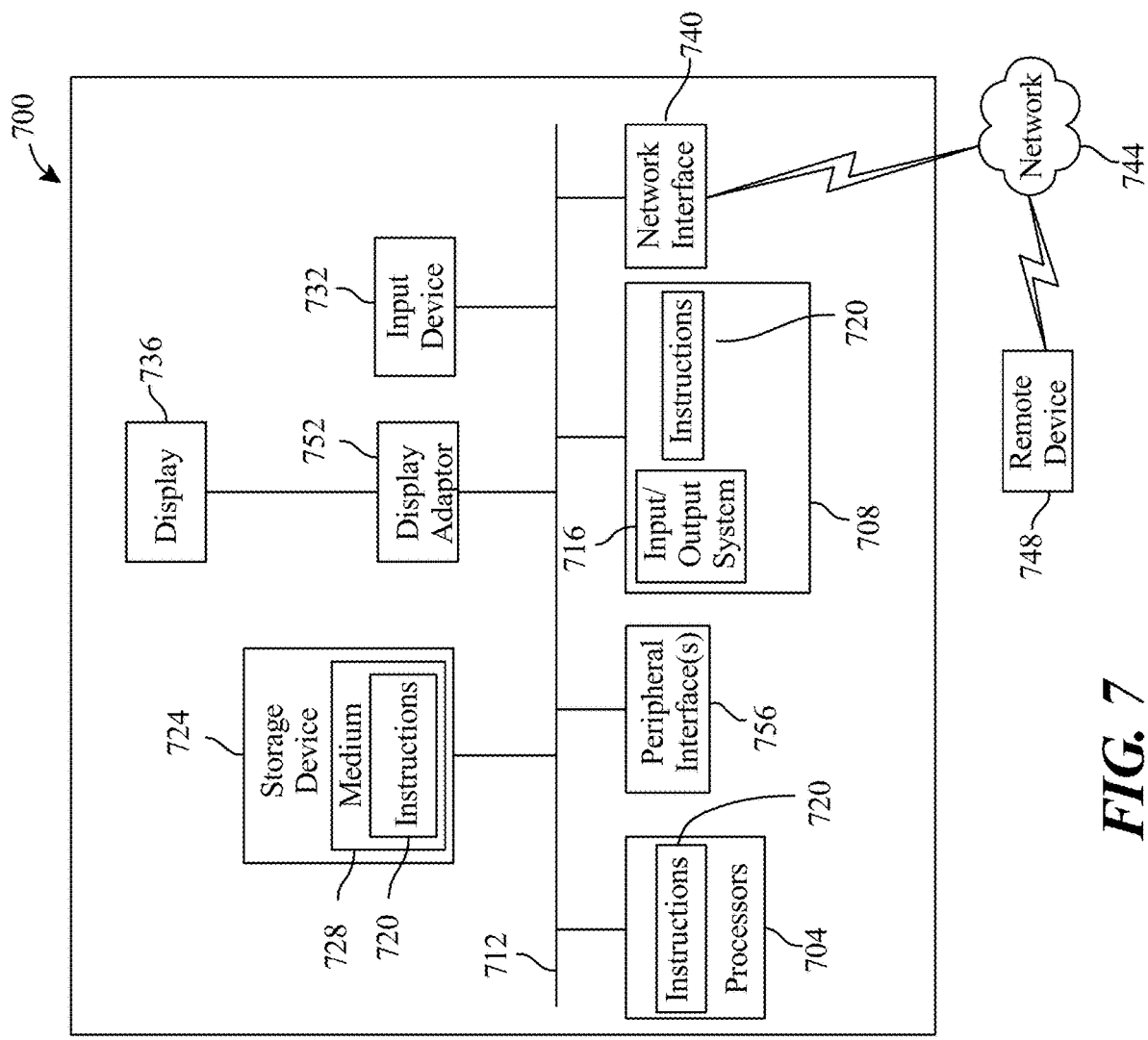
FIG. 7 is a flow diagram of a method of manufacturing an electric propulsion system with a power harvesting system.
Figure 8:
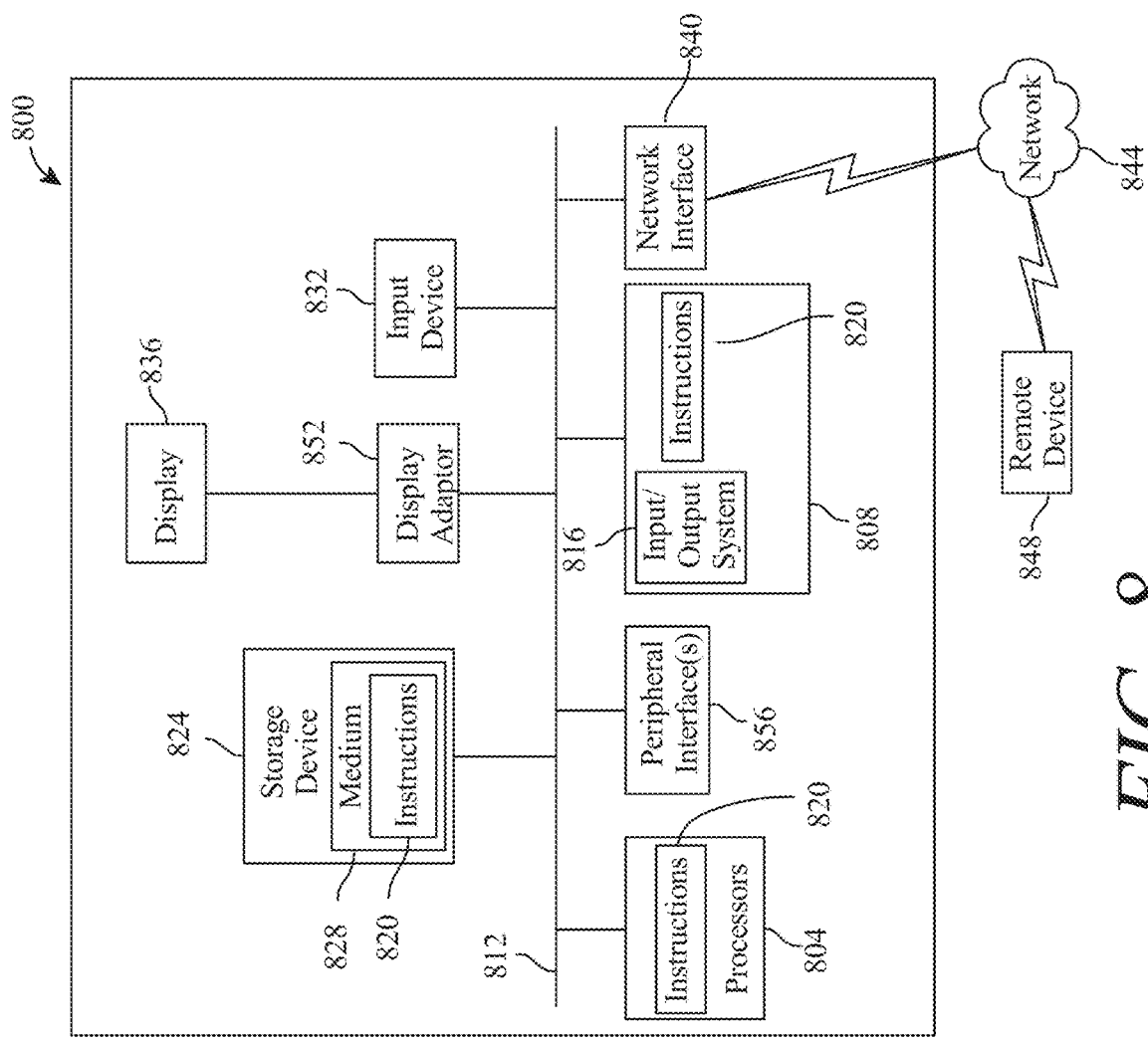

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 344, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric propulsion system with a power harvesting system, the electric propulsion system comprising:
   a propulsor configured to generate thrust; and
   an electric motor configured to power the propulsor and comprising:
     a stator configured to produce a magnetic field, wherein the stator comprises a winding;
     a rotor configured to be rotated by the magnetic field from the stator, wherein the rotor comprises:
       a plurality of spokes;
       an inductive coil attached to the rotor configured to generate an electric potential from a stator magnetic flux; and
       a hub, wherein the hub comprises an inner hub and an outer hub, wherein the outer hub is attached to the plurality of spokes; and
     an electronic component electrically powered by the inductive coil.

2. The electric propulsion system of claim 1, wherein the electronic component comprises a temperature sensor configured to detect a temperature of the electric motor.

3. The electric propulsion system of claim 1, wherein the electronic component comprises a motion sensor configured to detect a motion of the electric motor.

4. The electric propulsion system of claim 1, wherein the electronic component comprises a rotary encoder.

5. The electric propulsion system of claim 1, wherein the inductive coil is an air core coil.

6. The electric propulsion system of claim 1, wherein the inductive coil is located at an axial end of the rotor.

7. The electric propulsion system of claim 1, wherein the inductive coil is located proximate to the winding of the stator.

8. The electric propulsion system of claim 1, wherein the inductive coil is configured to convert a fringe flux of the stator into an electric potential.

9. The electric propulsion system of claim 1, wherein the inductive coil is configured to generate the potential when the rotor is rotating relative to the stator.

10. The electric propulsion system of claim 1, wherein the inductive coil is configured to generate the potential when the rotor is static relative to the stator.

11. The electric propulsion system of claim 1, wherein the rotor comprises an AC-to-DC converter configured to convert an alternating current from the inductive coil to provide the electronic component a direct current.

12. The electric propulsion system of claim 11, wherein the AC-to-DC converter further comprises:
    a rectifier configured to convert the alternating current to the direct current; and
    a voltage regulator configured to maintain a constant voltage level of the direct current.

13. The electric propulsion system of claim 1, wherein the electric motor comprises a wireless transceiver configured to transmit a datum from the electronic component to a monitoring system on an aircraft.

14. The electric propulsion system of claim 13, wherein the monitoring system of the aircraft comprises data storage configured to store data from the electronic component.

15. The electric propulsion system of claim 13, wherein the monitoring system of the aircraft is further configured to display the datum from the electronic component.

16. The electric propulsion of claim 1, wherein:
the rotor comprises a magnetic element; and
the windings of the stator produce a magnetic field that exerts a force on the magnetic element to cause the rotor to rotate.

17. The electric propulsion system of claim 16, wherein the magnetic element is a permanent magnet.

18. The electric propulsion system of claim 1, wherein the rotor is integrated in the propulsor.

19. The electric propulsion system of claim 18, further comprising:
a rotor shaft fixedly attached to the propulsor of the electric aircraft.

20. The electric propulsion system of claim 1, wherein the inner hub is secured to the outer hub using a locking mechanism, wherein the locking mechanism is configured to removably attach a sprag to the hub.

* * * * *